United States Patent
Ammirata

(10) Patent No.: US 9,338,259 B2
(45) Date of Patent: May 10, 2016

(54) USER DEFINED PROTOCOL FOR ZERO-ADDED-JITTER AND ERROR FREE TRANSMISSION OF LAYER-2 DATAGRAMS ACROSS LOSSY PACKET-SWITCHED NETWORK LINKS

(71) Applicant: Sergio Ammirata, Coral Springs, FL (US)

(72) Inventor: Sergio Ammirata, Coral Springs, FL (US)

( * ) Notice: Subject to any disclaimer, the term of this patent is extended or adjusted under 35 U.S.C. 154(b) by 0 days.

(21) Appl. No.: 14/173,183

(22) Filed: Feb. 5, 2014

(65) Prior Publication Data

US 2015/0381323 A1   Dec. 31, 2015

(51) Int. Cl.
| | |
|---|---|
| *H04L 12/801* | (2013.01) |
| *H04L 29/06* | (2006.01) |
| *H04L 12/26* | (2006.01) |
| *H04L 1/16* | (2006.01) |

(52) U.S. Cl.
CPC .............. *H04L 69/04* (2013.01); *H04L 1/1607* (2013.01); *H04L 43/087* (2013.01)

(58) Field of Classification Search
None
See application file for complete search history.

(56) References Cited

U.S. PATENT DOCUMENTS

| 6,693,921 B1 | 2/2004 | Whitfield | |
|---|---|---|---|
| 7,522,528 B2 | 4/2009 | Fellman | |
| 7,826,441 B2 | 11/2010 | Black | |
| 2003/0086372 A1* | 5/2003 | Pate | H04J 3/0632 370/235 |
| 2008/0232469 A1* | 9/2008 | Nie | H04N 19/159 375/240.12 |
| 2014/0003226 A1 | 1/2014 | Amir | |

* cited by examiner

*Primary Examiner* — Kevin C Harper
(74) *Attorney, Agent, or Firm* — GrayRobinson, PA; Donald S. Showalter

(57) ABSTRACT

A zero-added-jitter protocol for transmission of datagrams over packet-switched networks between two or more connected microprocessor devices with negligible packet delay variation and negative acknowledgment datagram recovery. A method for the analysis and preservation of the instantaneous bitrate and packet spacing provides for the output of the datagrams to a network facing provider edge device matching in timing and inter-packet spacing, that which was originally received, along with a pre-configured time-delay for error correction. Additional embodiments provide duplication of path for reduction of re-requests; the splitting of path for faster transport between transmitter and receiver; encryption for more secure transport between transmitter and receiver; compression for more efficient transport between transmitter and receiver; and encryption and compression, for more secure, efficient transport between transmitter and receiver.

7 Claims, 6 Drawing Sheets

USER DEFINED PROTOCOL FOR ZERO-ADDED-JITTER AND ERROR FREE TRANSMISSION OF LAYER-2 DATAGRAMS ACROSS LOSSY PACKET-SWITCHED NETWORK LINKS

FIELD OF THE INVENTION

The invention relates to the field of data communications via packet switched networks.

BACKGROUND OF THE INVENTION

Various User Defined Protocols (UDP) enable the transport of layer-2 datagrams, primarily but not limited to carrying media streams across packet switched networks. Prior art is limited to packet recovery, re-request mechanisms, and buffering; to management of the number of re-requests; or to dynamically adjusting the size of the buffer, the latter method having been developed specifically for voice communications. These mechanisms correct for packet loss due to congestion, router queue overflow or other transmission errors sometimes present when sending large bursts of data. Prior art lacks means to restore the original instantaneous bitrate and inter-packet spacing which are lost when buffering.

Failure to restore the original instantaneous bitrate and inter-packet spacing may lead to increased jitter, the irregular movement, variation, or unsteadiness that is perceived when watching, measuring or listening to such a media or data stream. All means cited in the prior art attempt to ensure the datagrams are as complete as possible, subject to an upper limit of the maximum time period that a buffer may hold. They do not attempt to restore the original instantaneous bitrate and inter-packet spacing. Prior art notes that transmission re-requests may in fact add jitter, and attempts to minimize the perception of it by time-stamping, leaving it to the receiver to make adjustments.

SUMMARY OF THE INVENTION

In this invention, we present a method for the preservation of the instantaneous bitrate and packet spacing for transmission with zero-added-jitter, even while adding a pre-configured time delay for error correction.

A first embodiment of the present invention analyzes the original instantaneous bitrate and inter-packet spacing of the original transmitted datagrams, calculates a virtual packet size based on the bytes required to fill a private wire or set of point-to-point virtual circuits of predefined bitrate capacity set by the user, in a time equal to the inter-packet interval between the current and previous incoming datagrams, and in addition provides for packet recovery, a re-request mechanism, and buffering. A transmitter transmits the datagrams from one point in a packet switched network to another. The receiver then outputs datagrams to a network facing provider edge device with zero-added-jitter, because the output matches in timing and inter-packet spacing, that which was originally received, along with a pre-configured time-delay for error correction.

DETAILED DESCRIPTION OF PREFERRED EMBODIMENTS

Figure 1:
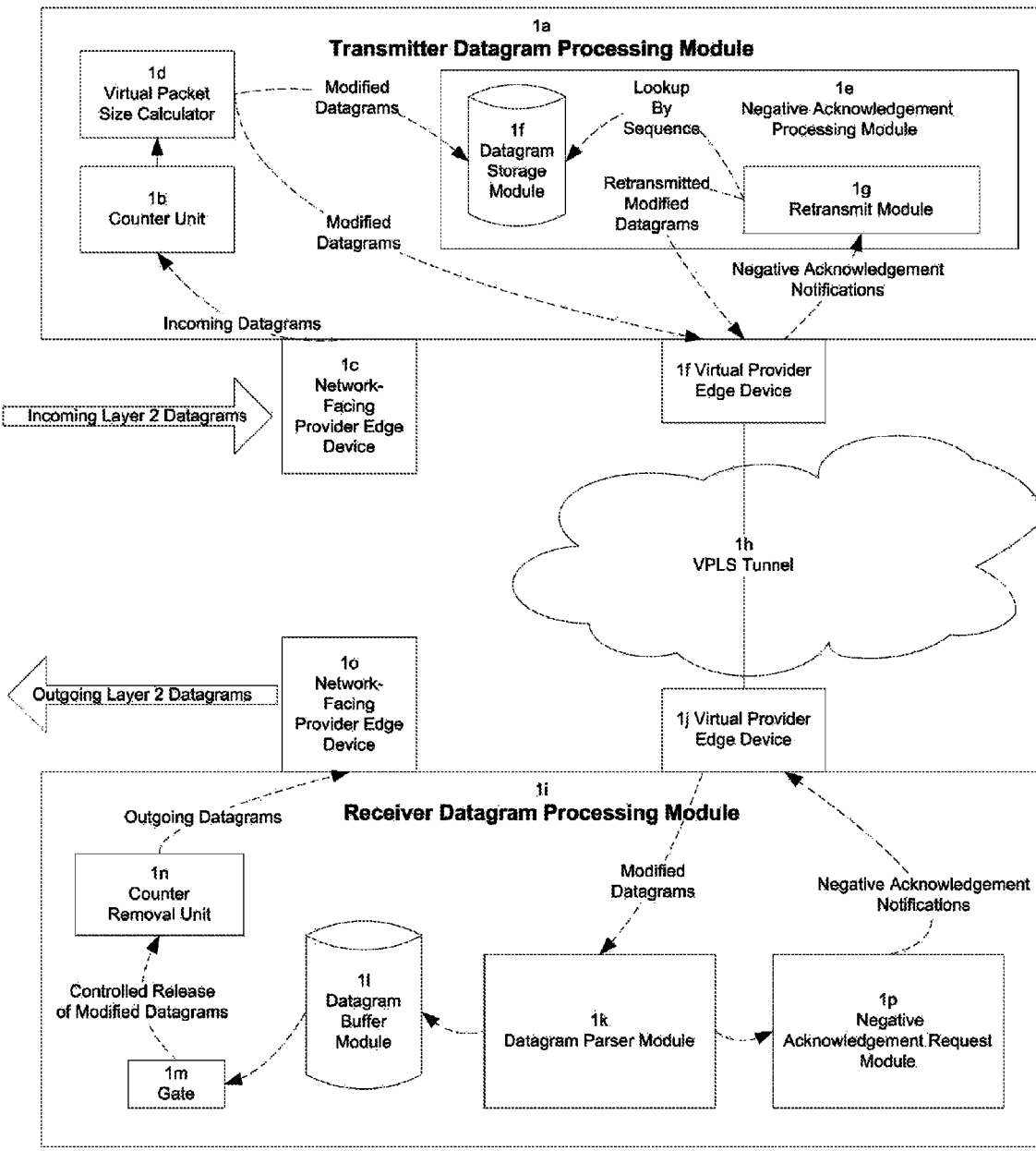
FIG. 1 is a schematic diagram illustrating a first embodiment.

In a first embodiment 1 of the present invention, shown in FIG. 1, the transmitter datagram processing module 1*a* contains a virtual packet size calculator 1*d* which analyzes the original instantaneous bitrate and inter-packet spacing of the incoming packets which arrive via a network facing provider edge device 1*c*. It calculates a virtual packet size based on the bytes required to fill a private wire or set of point-to-point virtual circuits of predefined bitrate capacity set by the user, in a time equal to the inter-packet interval between the current and previous incoming datagrams. It tags the datagram with that calculated virtual packet size. A counter unit 1*b* had previously tagged the datagram with a sequence number. The datagram, now tagged with the two additional pieces of information, is sent out to a virtual provider edge device 1*f*, and a copy stored in the datagram storage module 1*f* which is part of the negative acknowledgement processing module 1*e*.

At a receiver datagram processing module 1*i* side of the VLPS (Virtual Private LAN Service) 1*h*, the datagram arrives through a virtual provider edge device 1*j* at the datagram parser module 1*k*. The datagram parser module 1*k* examines the sequence, and discards duplicates. If not a duplicate, it is forwarded to a datagram buffer module 1*l*, and a copy sent to a negative acknowledgement request module 1*p*.

For the datagrams stored in the datagram buffer module, a gate 1*m* reads the tagged virtual packet size, and with it, releases the datagrams on a first-in, first-out basis using the following algorithm:

1. A total value of virtual bytes (TVVB) is calculated for the entire buffer using the sum of all the virtual packet sizes for all the packets stored in it.
2. A fixed virtual total target buffer size (VTTBS) is calculated using the bitrate of the private wire (BPW) and the desired delay (DD) using this formula: VTTBS=BPW (bytes/seconds)×DD (seconds)
3. The gate will output datagrams to the counter removal unit (1*n*) at a rate that keeps TVVB=VTTBS.

This produces a rate and inter-packet spacing matching the incoming inter-packet spacing as calculated by the virtual packet size calculator 1*d*, while at the same time provides a fixed precise delay. The counter removal unit 1*n* removes the tags and the packets are released to the network facing edge provider 1*o*.

By having matched the rate and inter-packet spacing, embodiment 1 has transported the datagrams without additional jitter, while adding a buffer in which to request and correct errors in transmission.

For the datagrams that had been copied and forwarded to a negative acknowledgement request module 1*p*, should that module detect a packet missing from the sequence, it sends a negative acknowledgement notification via the virtual provider edge devices 1*f* and 1*j* and VPLS tunnel 1*h* to a retransmit module 1*g* in the transmitter datagram processor module 1*a*. The retransmit module 1*g* retrieves the specific packet from the datagram storage module, and resends it via the virtual provider edge devices 1*f* and 1*j* and VPLS tunnel 1*h* to a datagram parser module 1k in a receiver datagram processing module 1i, which then adds it to a datagram buffer module 1l.

Figure 2:
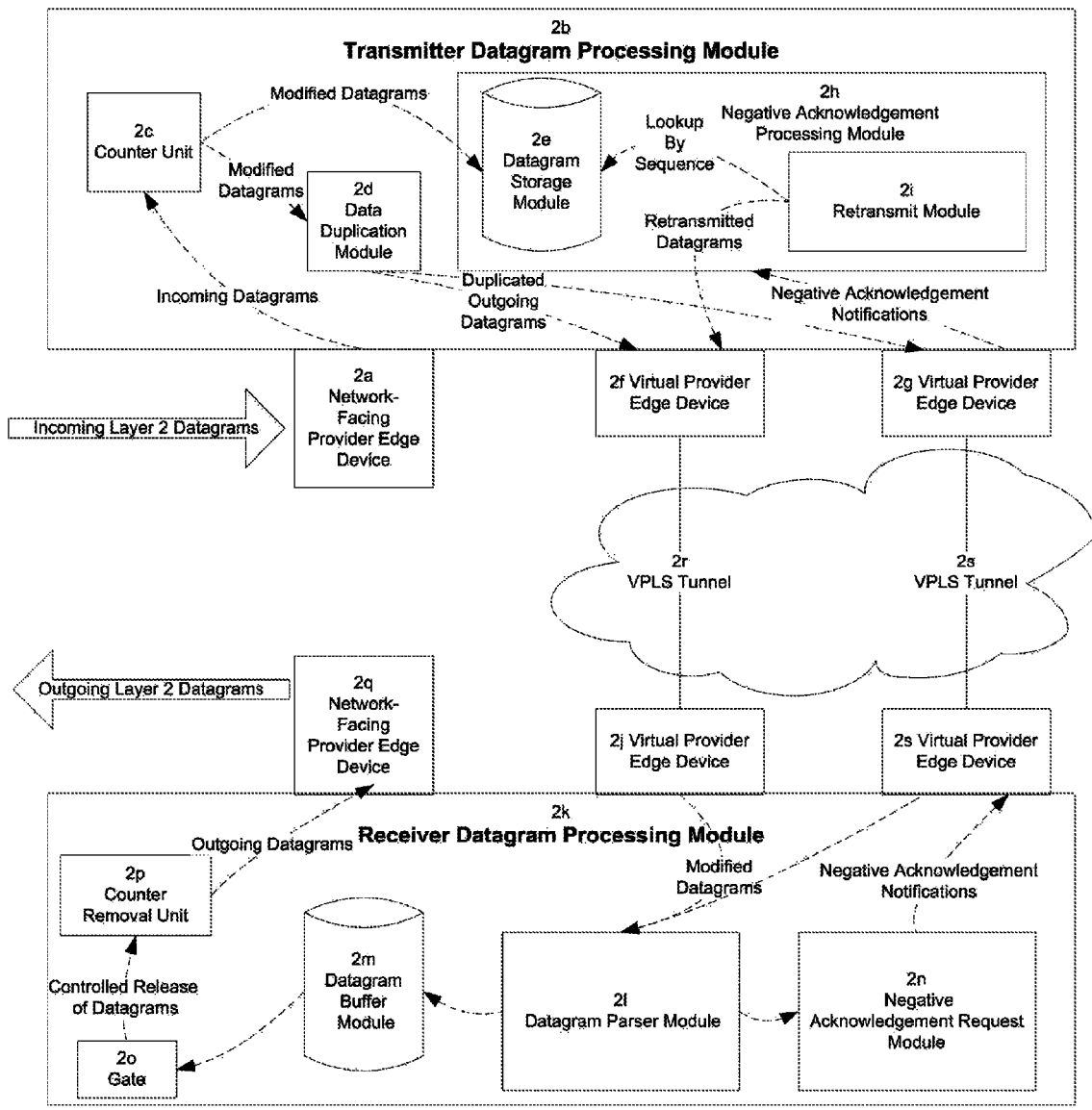
FIG. 2 is a schematic diagram illustrating a second embodiment.

A second embodiment 2 of the invention, seen in FIG. 2, provides the same process and benefits as that of first embodiment 1, and adds a data duplication module 2d and redundant path 2r and 2s between transmitter and receiver to reduce re-requests.

Figure 3:
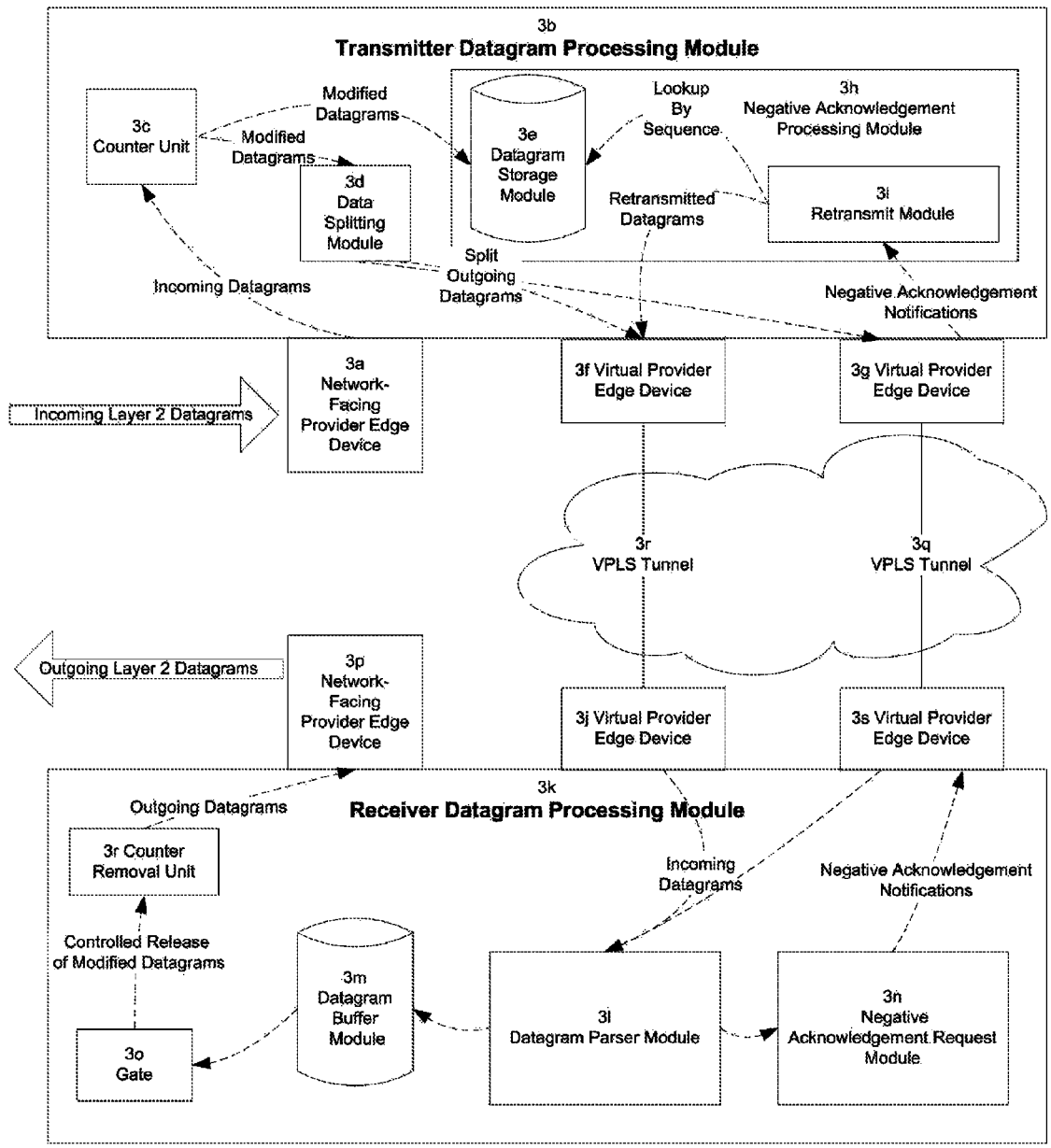
FIG. 3 is a schematic diagram illustrating a third embodiment.

A third embodiment 3 of the invention, seen in FIG. 3, provides the same process and benefits as that of first embodiment 1, and adds a data splitting module 3d and a split path 3r and 3q between transmitter and receiver to transmit up to twice as fast.

Figure 4:
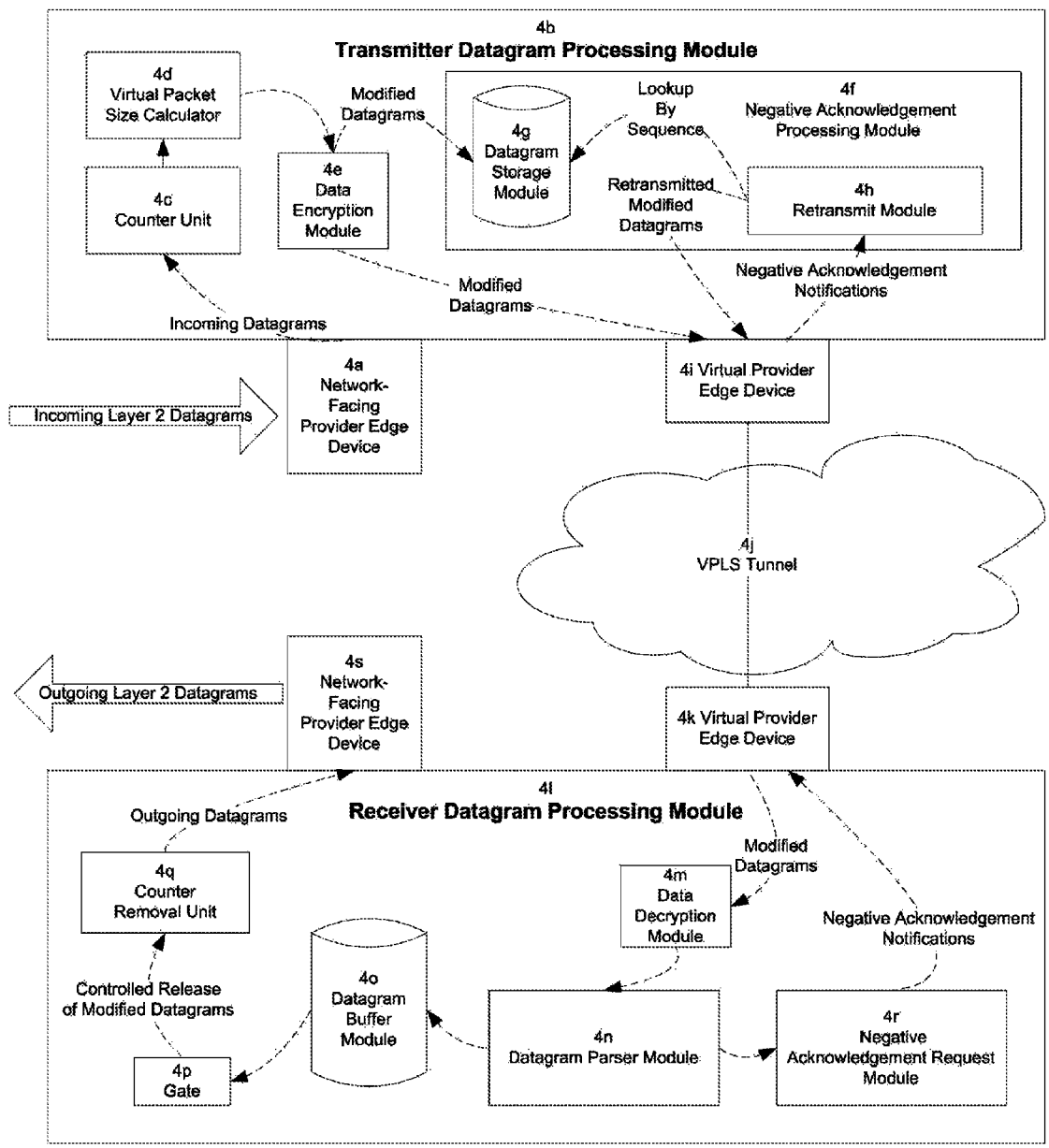
FIG. 4 is a schematic diagram illustrating a fourth embodiment.

A fourth embodiment 4 of the invention, seen in FIG. 4, provides the same process and benefits as that of first embodiment 1, and adds a data encryption module 4e and a data decryption module 4m, providing greater security and privacy for transmission between the transmitter datagram processing module and the receiver datagram processor module.

Figure 5:
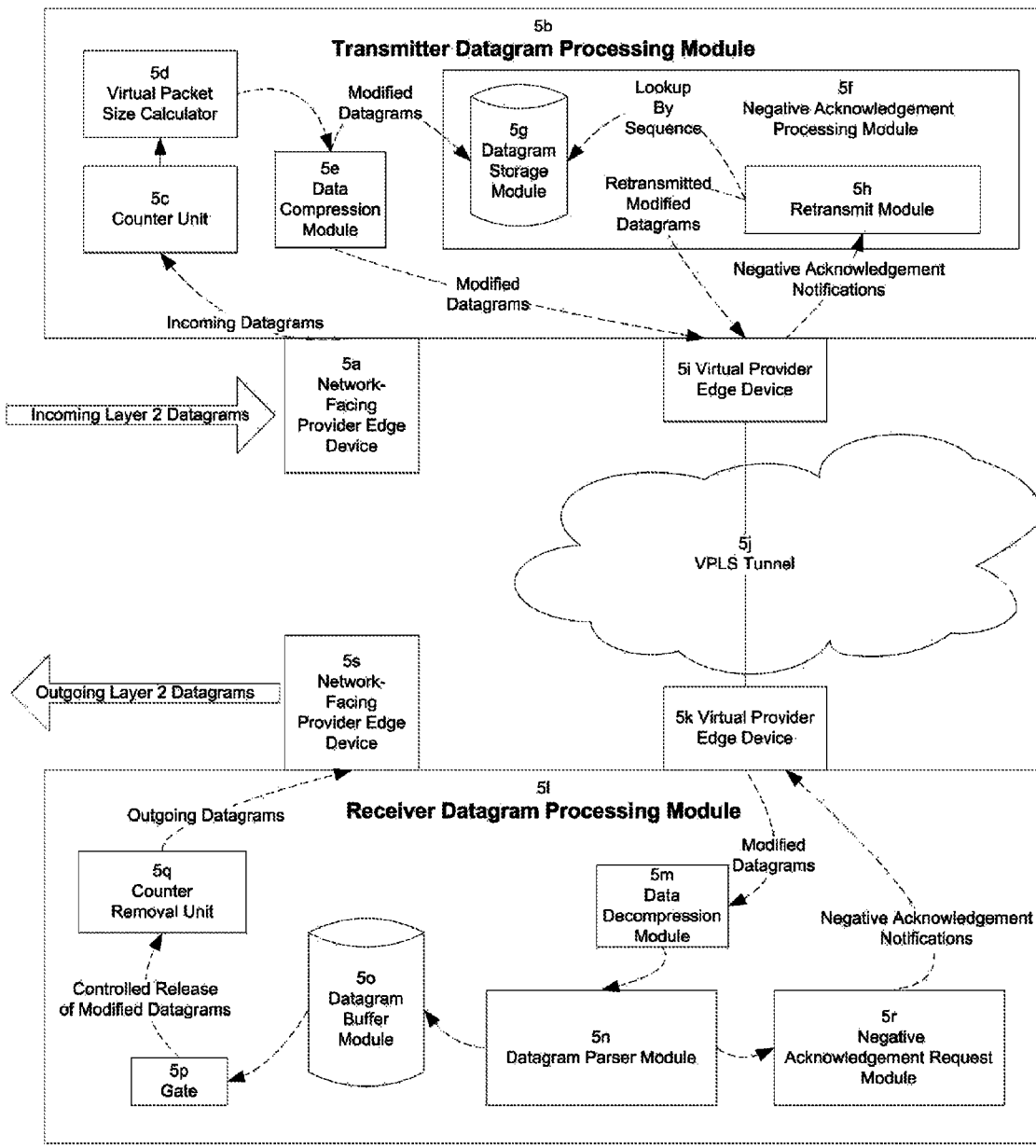
FIG. 5 is a schematic diagram illustrating a fifth embodiment.

A fifth embodiment 5 of the invention, seen in FIG. 5, provides the same process and benefits as that of first embodiment 1, and adds a data compression module 5e and a data decompression module 5m, providing more efficient transmission between the transmitter datagram processing module 5b and the receiver datagram processor module 5l.

Figure 6:
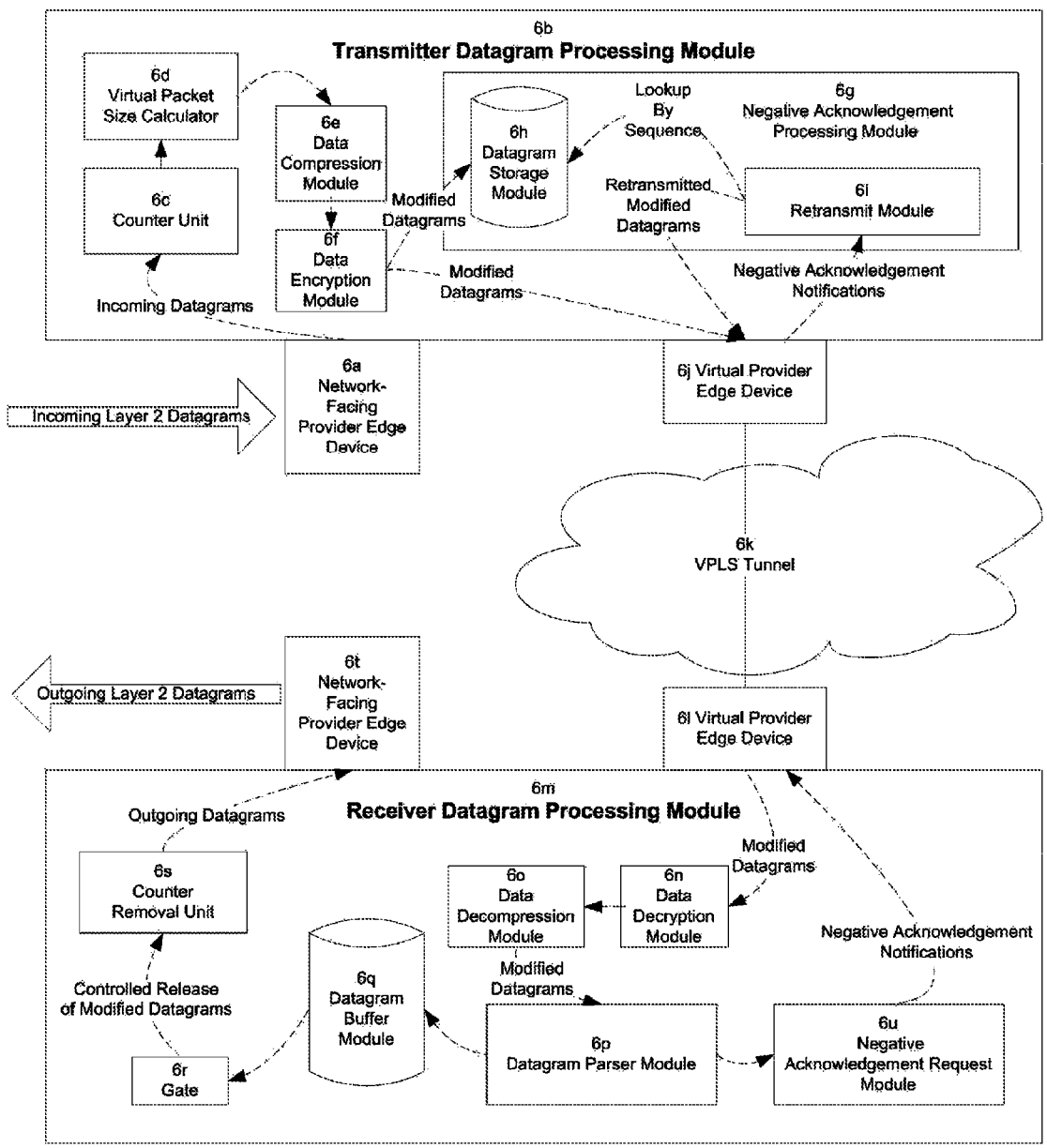
FIG. 6 is a schematic diagram illustrating a sixth embodiment.

A sixth embodiment 6 of the invention, seen in FIG. 6, provides the same process and benefits as that of the first embodiment 1, and adds a data encryption module 6f, a data decryption module 6n, a data compression module 6e and a data decompression module 6o, providing greater security, privacy and efficiency for transmission between the transmitter datagram processing module 6b and the receiver datagram processor module 6m.

REFERENCE NUMERALS

Reference Numerals for Drawing 1

1a: Transmitter Datagram Processing Module
1b: Counter Unit
1c: Network Facing Provider Edge Device
1d: Virtual Packet Size Calculator
1e: Negative Acknowledgement Processing Module
1f: Datagram Storage Module
1g: Retransmit Module
1h: VPLS Tunnel
1i : Receiver Datagram Processing Module
1j: Virtual Provider Edge Device
1k: Datagram Parser Module
1l: Datagram Buffer Module
1m: Gate
1n: Couter Removal Unit
1o: Network Facing Provider Edge Device Reference Numerals for Drawing 2

2a: Network Facing Provider Edge Device
2b: Transmitter Datagram Processing Module
2c: Counter Unit
2d: Data Duplication Module
2e: Datagram Storage Module
2f: Virtual Provider Edge Device
2g: Virtual Provider Edge Device
2h: Negative Acknowledgement Processing Module
2i: Retransmit Module
2j: Virtual Provider Edge Device
2k: Receiver Datagram Processing Module
2l: Datagram Parser Module
2m Datagram Buffer Module
2n: Negative Acknowledgement Request Module
2o: Gate
2p: Counter Removal Unit
2q: Network Facing Provider Edge Device
2r: VPLS Tunnel
2s: VPLS Tunnel Reference Numerals for Drawing 3

3a: Network Facing Provider Edge Device
3b: Transmitter Datagram Processing Module
3c: Counter Unit
3d: Data Splitting Module
3e: Datagram Storage Module
3f: Virtual Provider Edge Device
3g: Virtual Provider Edge Device
3h: Negative Acknowledgement Processing Module
3i: Retransmit Module
3j: Virtual Provider Edge Device
3k: Receiver Datagram Processing Module
3l: Datagram Parser Module
3m: Datagram Buffer Module
3n: Negative Acknowledgement Request Module
3o: Gate
3p: Network Facing Provider Edge Device
3q: VPLS Tunnel
3r: Counter Removal Unit
3s: Virtual Provider Edge Device Reference Numerals for Drawing 4

4a: Network Facing Provider Edge Device
4b: Transmitter Datagram Processing Module
4c: Counter Unit
4d: Virtual Packet Size Calculator
4e: Data Encryption Module
4f: Negative Acknowledgement Module
4g: Datagram Storage Module
4h: Retransmit Module
4i: Virtual Provider Edge Device
4j: VPLS Tunnel
4k: Virtual Provider Edge Device
4l: Receiver Datagram Processing Module
4m: Data Encryption Module
4n: Datagram Parser Module
4o: Datagram Buffer Module
4p: Gate
4q: Counter Removal Unit
4r: Negative Acknowledgement Module
4s: *Network Facing Provider Edge Device*

Reference Numerals for Drawing 5

5a: Network Facing Provider Edge Device
5b: Transmitter Datagram Processing Module
5c: Counter Unit
5d: Virtual Packet Size Calculator
5e: Data Compression Module
5f: Negative Acknowledgement Processing Module
5g: Datagram Storage Module
5h: Retransmit Module
5i: Virtual Provider Edge Device
5j: VPLS Tunnel
5k: Virtual Provider Edge Device
5l: Receiver Datagram Processing Module 5m: Data Decompression Module
5n: Data Parser Module
5o: Datagram Buffer Module
5p: Gate
5q: Counter Removal Unit
5r: Negative Acknowledgement Request Module
5s: Network Facing Provider Edge Device Reference Numerals for Drawing 6

6a: Network Facing Provider Edge Device
6b: Transmitter Datagram Processing Module
6c: Counter Unit
6d: Virtual Packet Size Calculator
6e: Data Compression Module
6f: Data Encryption Module
6g: Negative Acknowledgement Processing Module
6h: Datagram Storage Module
6i: Retransmit Module
6j: Virtual Provider Edge Device
6k: VPLS Tunnel
6l: Virtual Provider Edge Device
6m: Receiver Datagram Processing Module
6n: Data Decryption Module
6o: Data Decompression Module
6p: Datagram Parser Module
6r: Gate
6s: Counter Removal Unit
6t: Network Facing Provider Edge Device
6u: Negative Acknowledgement Request Module

I claim:

1. A process for the transmission of datagrams over a packet-switched network, said process comprising the steps of:
   (a) tagging each of the datagrams with:
      (i) a sequence number, and
      (ii) a virtual packet size, said virtual packet size being a number of bytes required to fill a private wire, or a set of point-to-point virtual circuits, of a predefined bitrate capacity set by a user, in a time equal to an inter-packet interval between the datagrams;
   (b) storing of each of the datagrams tagged in accordance with tagging step (a);
   (c) transmitting the datagrams as tagged in accordance with tagging step (a) to a VPLS tunnel via a first virtual provider edge device;
   (d) upon receiving a negative acknowledgment notification transmitting a specific one of the datagrams as stored in storing step (b) to said VPLS tunnel via said first virtual provider edge device;
   (e) receiving, from said VPLS tunnel via a second virtual provider edge device, the datagrams transmitted in step (c) or step (d);
   (f) detecting, based on said sequence number, loss of one or more of the datagrams transmitted in step (c) or step d and, upon detection of a loss of one of the datagrams, sending a said negative acknowledgment notification;
   (g) inserting into a buffer the datagrams received in receiving step (e) with the exclusion of any duplicate ones of the datagrams received in receiving step (e), the datagrams being inserted into said buffer based on said sequence number;
   (h) maintaining said buffer at a limited size by releasing the datagrams from said buffer on a first-in, first-out basis, the datagrams being released from said buffer at a rate determined based on said virtual packet size and a user-determined fixed delay and said predefined bitrate capacity;
   (i) removing said sequence number and said virtual packet size from the datagrams released from said buffer, and
   (j) after carrying out step (i), outputting to a network provider facing provider edge device the datagrams released from said buffer.

2. A process as claimed in claim 1, further comprising the step of duplicating the datagrams tagged in tagging step (a), and wherein said transmitting step (c) comprises transmitting the datagrams in duplicate.

3. A process as claimed in claim 1, further comprising the step of splitting said datagrams tagged in tagging step (a) into two streams of data, and wherein said transmitting step (c) comprises transmitting said two data streams at least partially concurrently.

4. A process as claimed in claims 1, 2, or 3, further comprising the steps of encrypting said datagrams prior to carrying out said transmitting step (c), and decrypting said datagrams after carrying out said receiving step (e).

5. A process as claimed in claims 1, 2, or 3, further comprising the steps of compressing said datagrams prior to carrying out transmitting step (c), said and decompressing the datagrams after carrying out receiving step (e).

6. A process as claimed in claims 1, 2 or 3, further comprising the steps of:
   (k) compressing said datagrams, and
   (l) encrypting the datagrams prior to carrying out transmitting step (c), said encrypting step being carried out after compressing step (k);
   (m) decrypting said datagrams after carrying out receiving step (e), and
   (n) decompressing said datagrams after carrying out decrypting step (m).

7. A process as claimed in claims 1, 2 or 3 wherein, said maintaining step (h) comprises the substeps of: (1) calculating a total value of virtual bytes for said buffer using a sum of said virtual packet size for each of the datagrams in said buffer, and (2) calculating a fixed virtual total target buffer size as a product of said predefined bitrate and said fixed delay, and (3) releasing the datagrams from said buffer at a rate that keeps said total value of virtual bytes equal to said virtual total target buffer size.

* * * * *